(12) United States Patent
Chitrapu et al.

(10) Patent No.: US 8,467,408 B2
(45) Date of Patent: Jun. 18, 2013

(54) POWER CONTROL IN ORTHOGONAL SUB-CHANNELS IN WIRELESS COMMUNICATIONS

(75) Inventors: Prabhakar R. Chitrapu, Blue Bell, PA (US); Behrouz Aghili, Melville, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 999 days.

(21) Appl. No.: 12/058,495

(22) Filed: Mar. 28, 2008

(65) Prior Publication Data

US 2008/0240151 A1 Oct. 2, 2008

Related U.S. Application Data

(60) Provisional application No. 60/909,006, filed on Mar. 30, 2007.

(51) Int. Cl.
*H04J 3/16* (2006.01)
(52) U.S. Cl.
USPC ............................................ 370/465; 370/336
(58) Field of Classification Search
None
See application file for complete search history.

(56) References Cited

U.S. PATENT DOCUMENTS

| | | | |
|---|---|---|---|
| 5,926,500 A | 7/1999 | Odenwalder | |
| 7,006,477 B1 | 2/2006 | Balachandran et al. | |
| 2001/0010684 A1 | 8/2001 | Willenegger et al. | |
| 2003/0162566 A1* | 8/2003 | Shapira et al. | 455/561 |
| 2006/0153220 A1 | 7/2006 | Elie-Dit-Cosaque et al. | |
| 2006/0280160 A1 | 12/2006 | Padovani et al. | |
| 2007/0265012 A1* | 11/2007 | Sorbara et al. | 455/446 |
| 2008/0151828 A1 | 6/2008 | Bjorken et al. | |
| 2008/0159122 A1* | 7/2008 | Dor | 370/208 |
| 2008/0159246 A1* | 7/2008 | Niemela | 370/339 |

FOREIGN PATENT DOCUMENTS

| | | |
|---|---|---|
| JP | 09-252482 | 9/1997 |
| JP | 2002-159047 | 5/2002 |
| WO | 00/13443 | 3/2000 |
| WO | 2005/112299 | 11/2005 |

OTHER PUBLICATIONS

Nokia, "Voice Capacity Evolution with Orthogonal Sub Channel", 3GPP TSG GERAN # 33, GP-070214, Agenda Item 6.1, 7.1.5.6, (Seoul, South Korea, Feb. 12-16, 2007).*

Third Generation Partnership Project, " Technical Specification Group GSM/EDGE Radio Access Network; Multiplexing and multiple access on the radio path (Release 4)," 3GPP TS 45.002 V4.8.0 (Jun. 2003).

Third Generation Partnership Project, "Technical Specification Group GSM/EDGE Radio Access Network; Feasibility study for evolved GSM/EDGE Radio Access Network (GERAN) (Release 7)", 3GPP TR 45.914 V7.2.0 (Feb. 2007).

(Continued)

*Primary Examiner* — Chi Pham
*Assistant Examiner* — Kouroush Mohebbi
(74) *Attorney, Agent, or Firm* — Volpe and Koenig, P.C.

(57) ABSTRACT

A method and apparatus for power control in a wireless communication involves establishing at least two orthogonal sub-channels within a channel for communication and controlling transmitted power in each sub-channel independently.

14 Claims, 2 Drawing Sheets

OTHER PUBLICATIONS

Third Generation Partnership Project, "Technical Specification Group GSM/EDGE Radio Access Network; Multiplexing and multiple access on the radio path (Release 7)," 3GPP TS 45.002 V7.3.0 (Feb. 2007).

Nokia, "Draft Change Request for 3GPP TR 45.912", Rev. 7.1.0, 3GPP TSG-GERAN Meeting #33, GP-070214, (Seoul, South Korea, Feb. 12-16, 2007).

Nokia, "Voice Capacity Evolution With Orthogonal Sub Channel", 3GPP TSG GERAN #33, GP-070214, Agenda Item 6.1, 7.1.5.6, (Seoul, South Korea, Feb. 12-16, 2007).

Third Generation Partnership Project, "Technical Specification Group GSM/EDGE Radio Access Network; Multiplexing and multiple access on the radio path (Release 4)," 3GPP TS 45.002 V4.8.0 (Jun. 2003).

Third Generation Partnership Project, "Technical Specification Group GSM/EDGE Radio Access Network; Multiplexing and multiple access on the radio path (Release 5)," 3GPP TS 45.002 V5.13.0 (Jan. 2005).

Third Generation Partnership Project, "Technical Specification Group GSM/EDGE Radio Access Network; Multiplexing and multiple access on the radio path (Release 6)," 3GPP TS 45.002 V6.12.0 (Nov. 2005).

Third Generation Partnership Project, "Technical Specification Group GSM/EDGE Radio Access Network; Feasibility study for evolved GSM/EDGE Radio Access Network (GERAN) (Release 7)", 3GPP TR 45.912 V7.2.0 (Feb. 2007).

Third Generation Partnership Project, "Technical Specification Group GSM/EDGE Radio Access Netowrk; Multiplexing and multiple access on the radio path (Release 7)," 3GPP TS 45.002 V7.3.0 (Feb. 2007).

Third Generation Partnership Project, "Technical Specification Group GSM/EDGE Radio Access Network; Multiplexing and multiple access on the radio path (Release 7)," 3GPP TS 45.002 V7.6.0 (Nov. 2007).

Third Generation Partnership Project, "Technical Specification Group GSM/EDGE Radio Access Network; Mobile radio interface layer 3 specification, Radio Resource Control (RRC) protocol (Release 4)," 3GPP TS 44.018 V4.23.0 (May 2006).

Third Generation Partnership Project, "Technical Specification Group GSM/EDGE Radio Access Network; Mobile radio interface layer 3 specification; Radio Resource Control (RRC) protocol (Release 5)," 3GPP TS 44.018 V5.22.0 (May 2006).

Third Generation Partnership Project, "Technical Specification Group GSM/EDGE Radio Access Network; Mobile radio interface layer 3 specification; Radio Resource Control (RRC) protocol (Release 6)," 3GPP TS 44.018 V6.23.0 (Dec. 2007).

Third Generation Partnership Project, "Technical Specification Group GSM/EDGE Radio Access Network; Mobile radio interface layer 3 specification; Radio Resource Control (RRC) protocol (Release 7)," 3GPP TS 44.018 V7.8.0 (Mar. 2007).

Third Generation Partnership Project, "Technical Specification Group GSM/EDGE Radio Access Network; Mobile radio interface layer 3 specification; Radio Resource Control (RRC) protocol (Release 6)," 3GPP TS 44.018 V6.21.0 (Mar. 2007).

Third Generation Partnership Project, "Technical Specification Group GSM/EDGE Radio Access Network; Mobile radio interface layer 3 specification; Radio Resource Control (RRC) protocol (Release 7)," 3GPP TS 44.018 V7.12.0 (Mar. 2008).

Third Generation Partnership Project, "Technical Specification Group GSM/EDGE Radio Access Network; Mobile radio interface layer 3 specification; Radio Resource Control (RRC) protocol (Release 8)," 3GPP TS 44.018 V8.2.0 (Mar. 2008).

Third Generation Partnership Project, "Technical Specification Group GERAN; GSM/EDGE Radio Access Network (GERAN); Overall Description—Stage 2; (Release 4)," 3GPP TS 43.051 V4.0.0 (Nov. 2000).

Third Generation Partnership Project, "Technical Specification Group GSM/EDGE Radio Access Network; Overall description—Stage 2; (Release 5)," 3GPP TS 43.051 V5.10.0 (Aug. 2003).

Third Generation Partnership Project, "Technical Specification Group GSM/EDGE Radio Access Network; Overall description—Stage 2; (Release 7)," 3GPP TS 43.051 V7.0.0 (Aug. 2007).

Third Generation Partnership Project, "Technical Specification Group GSM/EDGE Radio Access Network; Overall description—Stage 2; (Release 6)," 3GPP TS 43.051 V6.0.0 (Nov. 2003).

Third Generation Partnership Project, "Technical Specification Group GSM/EDGE Radio Access Network; Physical layer on the radio path; General description (Release 7)," 3GPP TS 45.001 V7.7.0 (Feb. 2008).

Third Generation Partnership Project, "Technical Specification Group GSM/EDGE Radio Access Network; Physical layer on the radio path; General description (Release 5)," 3GPP TS 45.001 V5.9.0 (Apr. 2005).

Third Generation Partnership Project, "Technical Specification Group GSM/EDGE Radio Access Network; Physical layer on the radio path; General description (Release 4)," 3GPP TS 45.001 V4.5.0 (Apr. 2005).

Third Generation Partnership Project, "Technical Specification Group GSM/EDGE Radio Access Network; Physical layer on the radio path; General description (Release 6)," 3GPP TS 45.001 V6.7.0 (Nov. 2005).

Third Generation Partnership Project, "Technical Specification Group GSM/EDGE Radio Access Network; Physical layer on the radio path; General description (Release 6)," 3GPP TS 45.001 V6.8.0 (May 2007).

Third Generation Partnership Project, "Technical Specification Group GSM/EDGE Radio Access Network; Physical layer on the radio path; General description (Release 7)," 3GPP TS 45.001 V7.3.0 (Jun. 2006).

Third Generation Partnership Project, "Technical Specification Group GSM/EDGE Radio Access Network; Radio subsystem link control (Release 4)," 3GPP TS 45.008 V4.17.0 (Nov. 2005).

Third Generation Partnership Project, "Technical Specification Group GSM/EDGE Radio Access Network; Radio subsystem link control (Release 5)," 3GPP TS 45.008 V5.22.0 (Apr. 2006).

Third Generation Partnership Project, "Technical Specification Group GSM/EDGE Radio Access Network; Radio subsystem link control (Release 6)," 3GPP TS 45.008 V6.19.0 (Feb. 2007).

Third Generation Partnership Project, "Technical Specification Group GSM/EDGE Radio Access Network; Radio subsystem link control (Release 6)," 3GPP TS 45.008 V6.20.0 (Feb. 2008).

Third Generation Partnership Project, "Technical Specification Group GSM/EDGE Radio Access Network; Radio subsystem link control (Release 7)," 3GPP TS 45.008 V7.7. 0 (Feb. 2007).

Third Generation Partnership Project, "Technical Specification Group GSM/EDGE Radio Access Network; Radio subsystem link control (Release 7)," 3GPP TS 45.008 V7.11.0 (Feb. 2008).

* cited by examiner

POWER CONTROL IN ORTHOGONAL SUB-CHANNELS IN WIRELESS COMMUNICATIONS

CROSS REFERENCE

This claims the benefit of U.S. provisional application No. 60/909,006 filed Mar. 30, 2007, which is incorporated by reference as if fully set forth.

FIELD OF INVENTION

The present application is related to wireless communications.

BACKGROUND

The concept of Orthogonal Sub-channels (OSCs) and how they can be used to increase the voice capacity of GSM EDGE Radio Access Network (GERAN) cells has been disclosed by others (GSM is Global System for Mobile; EDGE is Enhanced Data rates for Global Evolution). In an OSC scheme, the base station (BS) uses Quadrature Phase-Shift Keying (QPSK) modulation for downlink (DL), which multiplexes voice data from two users. The multiplexing is done such that legacy Mobile Stations (MSs) using Gaussian Minimum Shift Keying (GMSK) can receive their respective data.

As an example, FIG. 1 shows a QPSK constellation chosen as a subset of an Eight Phase Shift Keying (8PSK) constellation. The most significant bit (MSB) and least significant bit (LSB) define two "orthogonal" sub-channels I and Q, wherein the bits are denoted as (OSC0, OSC1). Each sub-channel carries voice signals of two users in the DL direction. GMSK-only capable MSs are able to detect the individual sub-channels.

These prior OSC proposals also provide that downlink power control may use conditions of the weakest link as criteria. For example, in such an approach, if the weaker orthogonal sub-channel is I, the power control would be adjusted such that both sub-channels I and Q are equally increased until the sub-channel I attains the minimum acceptable power level. This approach would have the advantage of maintaining the shape of the QPSK constellation as circular, keeping all four constellation points equidistant, which provides maximum separation for best receiver decoding results. The disadvantage to this approach is that more power is used than is necessary on the sub-channel that is not the weakest link, (i.e., sub-channel Q in this example). Consequently, the interference between the sub-channels will increase.

SUMMARY

A method and apparatus for multi-user communication includes independent power control to each sub-channel designated to a user. A modified QPSK modulation mapping is performed for two users, each user being assigned to an orthogonal sub-channel. The power control method minimizes transmitted power on each sub-channel and interference between each sub-channel.

BRIEF DESCRIPTION OF THE DRAWINGS

A more detailed understanding may be had from the following description of a preferred embodiment, given by way of example and to be understood in conjunction with the accompanying drawing, wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
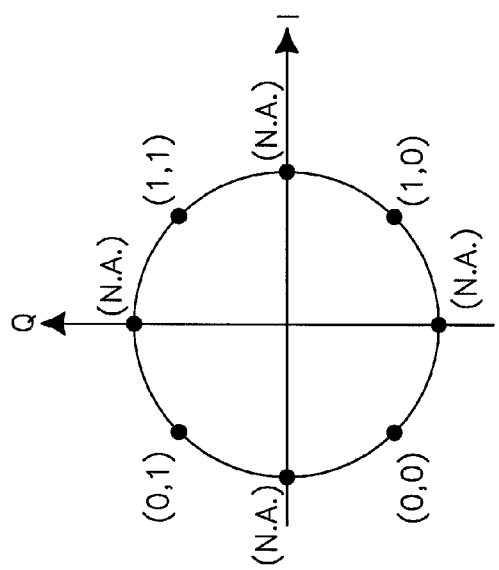
FIG. 1 shows a QPSK constellation chosen as a subset of an Eight Phase Shift Keying (8PSK) constellation and defining orthogonal sub-channels.
Figure 2:
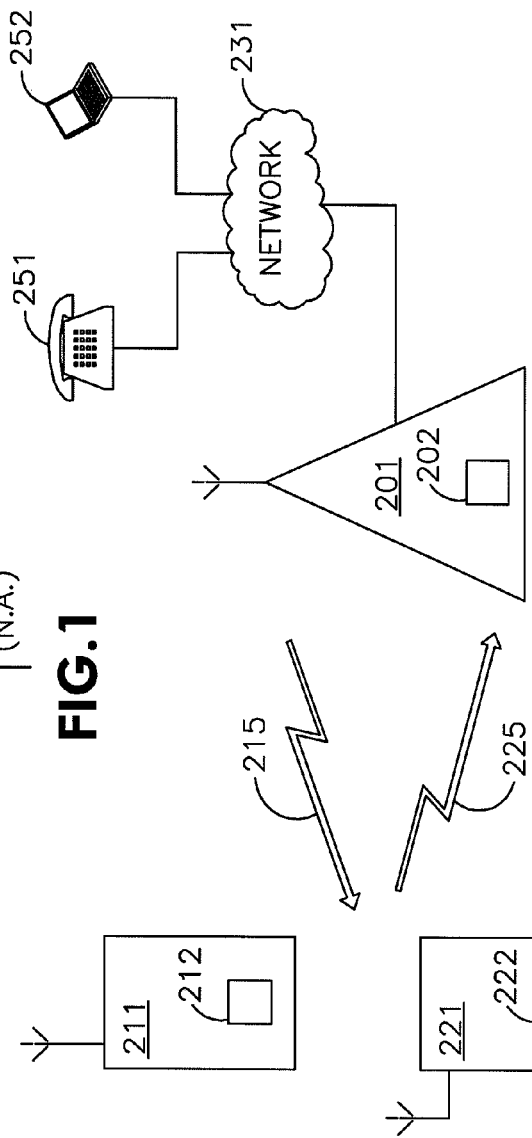
FIG. 2 shows a block diagram of a wireless communication with orthogonal sub-channel power control of a downlink signal.

FIG. 2 shows a base station 201, comprising a processor 202 configured to perform a method of a first embodiment. The processor 202 processes data from users 251, 252 via the communication network 231, to be transmitted to a WTRU 211 and a WTRU 221 on a wireless downlink signal 215. In order to increase capacity on the downlink signal 215, a radio resource can be mapped by the processor 202 whereby voice or data signals from two users 251, 252 sent in the same time slot can be individually detected by the intended receivers WTRUs 211 and 221. A modified QPSK modulation is applied to the downlink signal 215 using orthogonal sub-channels I and Q.

Figure 3A:
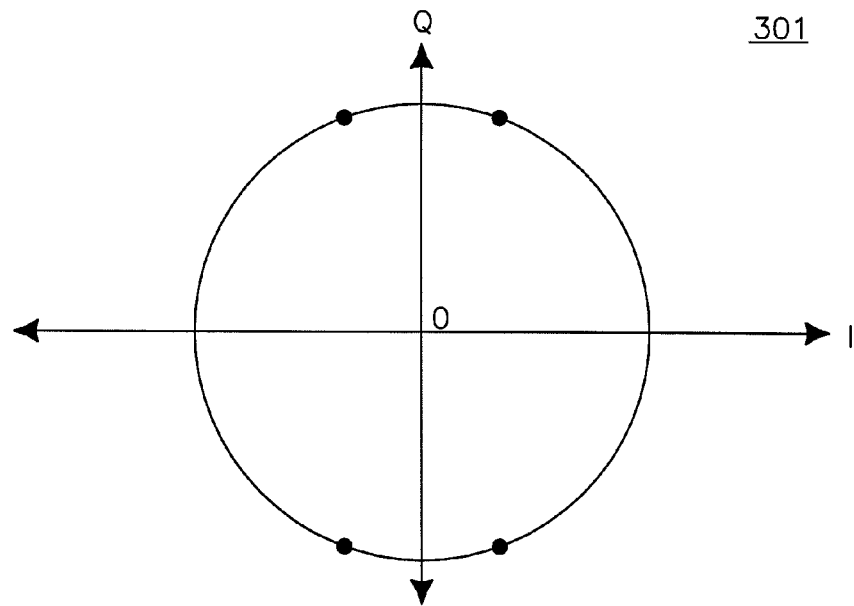
FIGS. 3A and 3B show orthogonal sub-channel I and Q constellations for a modified QPSK modulation with independent power control.
Figure 3B:
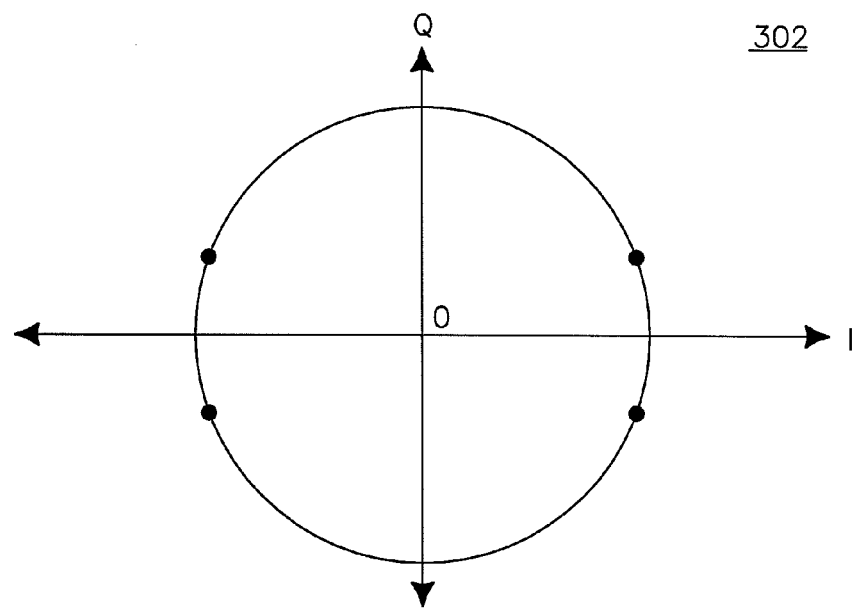

FIGS. 3A and 3B show examples of constellations for mapping of the orthogonal sub-channels I and Q according to a modified QPSK modulation, where power control is adjusted independently on each sub-channel I and Q. In FIG. 3A, a constellation 301 is rectangular along the Q axis, as a result of independent power adjustment upward on the sub-channel I, while applying zero power adjustment to sub-channel Q. Alternatively, there may also be some independent power control adjustment on the Q-sub-channel, so long as the relative increase in power control adjustment on the sub-channel I is greater than that on the sub-channel-Q.

Conversely in FIG. 3B, a constellation 302 is rectangular along the I axis, which results when independent power control adjustment is increased more on the sub-channel Q than on the sub-channel I.

Alternatively, there may be a decrease in power control adjustment to either of the sub-channels I and Q.

Adaptive power control is independently applied on the sub-channels I and Q, such that the rectangular constellation of the modified QPSK modulation can vary according to an independent power control parameter $\alpha$ on the sub-channel I and an independent power control parameter $\beta$ on the sub-channel Q. For example, the four constellation points for the modified QPSK according to this embodiment can be represented as shown in Table 1:

TABLE 1

| (0, 0) | (0, 1) | (1, 0) | (1, 1) |
|---|---|---|---|
| $\alpha + j\beta$ | $\alpha - j\beta$ | $-\alpha + j\beta$ | $-\alpha - j\beta$ |

The power control parameters α and β are constants set within the following limits:

$$0 < \alpha \leq 1;$$

$$0 < \beta \leq 1$$

where α and β are kept from approaching too close to 0. These parameters α and β represent the relative voltage amplitude for each of the two orthogonal sub-channel I and Q signals, where α is proportional to the square root of sub-channel I power $P_I$ and β is proportional to the square root of sub-channel Q power $P_Q$. If the total power transmitted for the two sub-channels I and Q is equal to P, then the power $P_I$ of the sub-channel I is as follows:

$$P_I = \alpha^2 P,$$

and the power $P_Q$ of the sub-channel Q channel is:

$$P_Q = \beta^2 P.$$

Practical implementation issues may constrain the ratio of α/β to be within limits. For example, one range for the ratio may be:

$$0.5 < \frac{\alpha}{\beta} < 2,$$

which would represent a practical constraint that the relative power between the two sub-channels I and Q should not be greater than 4, or equivalently, 6 dB. The exact constraint will be a determined by practical implementation issues, including, but not limited to quantization resolution of the analog to digital process.

Thus, the example constellations shown in FIGS. 3A and 3B each depict one of many possible variations, depending on the power control parameter selected. The processor 202 determines the power control parameters α and β depending on detected received channel quality according to typical power control feedback schemes. One example includes the processor 212 of WTRU 211 determining that the multiple errors have been detected on received signal 215, and in response, a channel quality indicator (CQI) is reported back to the base station 201. Based on the CQI, the processor 202 of base station 201 will select a power control parameter α that will independently increase power on the sub-channel I, which was allocated for the WTRU 211.

Various power control techniques can be applied to the orthogonal sub-channels I and Q, including open-loop based or close-loop based schemes. Also, the time scale of the power control adaptation may be optimally chosen. The criteria for power control adaptation may include signal power, noise, or interference levels in any combination.

The criteria for power control adaptation also takes into account dynamic range issues. For example, measures are taken to ensure that the two sub-channels I and Q are sufficiently close in power level to prevent the well-known signal capture problems that can occur when a receiver, such as the WTRU 211, must process two signals arriving at significantly different power levels. In particular, the capture problems can occur at the WTRU 211 receiver during A/D conversion, where an A/D converter dynamic range can be impacted by a large power level offset between received sub-channels I and Q. Maintaining a proper balance of the power levels can be achieved by the following two techniques, either alone or in a combination thereof: (1) during a scheduling and channel assignment process, avoid assigning the two sub-channels I and Q to the WTRUs 211 and 221 with excessive differences in required transmit power level; and (2) set the individual target power levels to values that support a proper balance. Optionally, an additional, larger dynamic range can be achieved by specifying an increased dynamic range capability for the mobile terminals (i.e. more bits in the A/D converter).

As part of the OSC modulation applied by the base station 201, a link adaptation is performed for multiplexing the receivers WTRU 211 and WTRU 221, by which the base station 201, or a Base Station System (BSS) to which it belongs, can dynamically change the multiplexing based on current channel conditions. Take for example, a scenario in which the WTRU 211 is located very close to the base station 201, and the WTRU 221 is located relatively further away from the base station 201, and the sub-channels are multiplexed to the same time slot. Using internal thresholds and hysteresis, the base station 201 may elect to reassign the WTRU 221 information from the multiplexed time slot and instead multiplex the WTRU 211 information with information of another WTRU that is located closer to the base station 201. This can be achieved by simple Intra-Cell Handover procedures, taking advantage of procedures such as "Packing/Unpacking". As an alternative option, the base station 201 may elect to have the WTRU 221 as the sole user of another time slot.

The modified QPSK modulation method described above relates to the packet-switched (PS) domain as follows. In PS domain, data is exchanged on channels, such as a Packet Data Channel (PDCH). An example of a PDCH is a time slot in a single carrier. The timeslot carries a radio burst, which is made up of a number of modulated symbols, each of which carries one or more bits of data. All of these bits belong to the PDCH. In the present context, the bits associated with each symbol in the downlink are assigned to multiple users, such as the WTRU 211 and the WTRU 221. For example, the MSB and LSB of the modified QPSK (i.e., (MSB, LSB)) may be assigned as follows: MSB to the WTRU 211, LSB to the WTRU 221. Correspondingly, in the uplink, the WTRU 211 and the WTRU 212 transmit on the same time slot and the same carrier frequency, but using different (preferably orthogonal) training sequences. In this embodiment, the definition of the PDCH is extended to such orthogonal sub-channels, referred to herein as Orthogonal-PDCH (O-PDCH). In the above example, two O-PDCHs are defined in terms of the two orthogonal sub-channels in both the downlink and the uplink.

As an implementation of this embodiment, the WTRU 211 or the WTRU 221 may receive a Packet Timing Control Channel (PTCCH) using an orthogonal sub-channel I or Q in the downlink. One advantage to this is that there would be no need for the base station 201 to allocate a separate channel for the PTCCH, and delay transmission of PTCCH information until an opportunity is available for the PTCCH transmission. Instead, the PTCCH information can be conveyed immediately on the I and Q sub-channels and received by the WTRU 211, 221 without delay. For uplink transmissions by the WTRU 211 and 221, a normal PDCH may be used, (e.g., for case where WTRUs 211,221 are legacy devices). Alternatively, an O-PDCH may be defined for the uplink, by which each of the sub-channels I and Q could carry a different data stream, or one sub-channel could carry data information and the other could carry voice or control information.

In an O-PDCH made up of more than one time slot, one or more time slots may carry orthogonal sub-channels I and Q, whereas other time slots support normal PDCH channels.

In order to uniquely identify the multiplexed WTRU 211 from the WTRU 221 in the downlink 215, the base station 201 can send two different blocks of information, using the sub-channels I and Q, respectively to the WTRU 211 and the WTRU 221. Within the same time slot, each block of information contains a Temporary Flow Identity (TFI) in the header that corresponds to the sub-channel I or Q.

Within an uplink 225 signal, the WTRU 211 can be uniquely identified from the WTRU 221 by scheduling of resources based on an uplink state flag (USF) parameter and/or the TFI. The scheduling of resources can be performed by the base station 201 using the orthogonal sub-channels I and Q to send two different USF values, one on each sub-channel, to the WTRU 211 and WTRU 221. When the WTRU 211 and WTRU 221 send information in the uplink, they are uniquely identified by a unique mapping of their corresponding TFI and the sub-channel number (e.g., 0 or 1). The base station processor 202 detects the unique TFI and sub-channel number on the received uplink, enabling unique identification of the WTRU 211 and WTRU 221 signals.

Finally, link adaptation can be applied to each O-PDCH by changing adaptively among various modulation and coding scheme (MCS) classes. Automatic Repeat Request (ARQ) with and without incremental redundancy can be applied for reliable transmission of data.

While embodiments have been described in terms of QPSK modulation, other possible variations may apply higher order modulations including, but not limited to 8PSK, 16QAM and 32QAM, whereby the constellations may reflect independent power control of sub-channels according to power control parameter selection and adjustment.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a base station, the method comprising:
    establishing in-phase and quadrature sub-channels in a same timeslot on a first downlink channel, wherein a first wireless transmit/receive unit (WTRU) is assigned to a first sub-channel of the in-phase and quadrature sub-channels and a second WTRU is assigned to a second sub-channel of the in-phase and quadrature sub-channels in the same timeslot;
    controlling transmit power for active transmissions to the first WTRU and the second WTRU in each sub-channel independently;
    transmitting information for the first WTRU on the first sub-channel and information for the second WTRU on the second sub-channel;
    monitoring channel conditions on the first downlink channel; and
    assigning the second WTRU from the second sub-channel to a second downlink channel based on the monitored channel conditions.

2. The method of claim 1, wherein the controlling transmit power is performed adaptively.

3. The method of claim 2, wherein the controlling transmit power is performed adaptively using criteria including at least one of a signal power level, a noise level, and an interference level.

4. The method as in claim 1, the method further comprising:
    assigning a third WTRU to the second sub-channel; and
    transmitting information for the first WTRU on the first sub-channel and information for the third WTRU on the second sub-channel.

5. The method of claim 1, wherein the first downlink channel and the second downlink channel are Packet Data Channels (PDCHs).

6. A base station, comprising:
    a processor and transceiver configured to:
        establish in-phase and quadrature sub-channels in a same time slot on a first downlink channel, wherein a first wireless transmit/receive unit (WTRU) is assigned to a first sub-channel of the in-phase and quadrature sub-channels and a second WTRU is assigned to a second sub-channel of the in-phase and quadrature sub-channels;
        control transmit power for active transmissions to the first WTRU and the second WTRU of the sub-channels independently;
        transmit information for the first WTRU on the first sub-channel and information for the second WTRU on the second sub-channel;
        monitor channel conditions on the first downlink channel; and
        assign the second WTRU from the second sub-channel to a second downlink channel based on the monitored channel conditions.

7. The base station of claim 6, wherein the processor and transceiver are further configured to perform the control of the transmit power adaptively.

8. The base station of claim 7, wherein the processor and transceiver are configured to perform the control of the transmit power using criteria including at least one of a signal power level, a noise level, and an interference level.

9. The base station of claim 6, wherein the processor and transceiver are further configured to:
  assign a third WTRU to the second sub-channel; and
  transmit information for the first WTRU on the first sub-channel and information for the third WTRU on the second sub-channel.

10. The base station of claim 6, wherein the first downlink channel and the second downlink channel are Packet Data Channels (PDCHs).

11. A wireless transmit/receive unit (WTRU) comprising:
  a processor configured to receive downlink transmissions from a base station via one of in-phase and quadrature sub-channels on a downlink channel, wherein the WTRU is assigned to a first sub-channel of the in-phase and quadrature sub-channels and another WTRU is assigned to a second sub-channel of the in-phase and quadrature sub-channels in the same timeslot on the downlink channel, wherein a transmit power for active transmissions to the WTRU and another WTRU on each of the in-phase and quadrature sub-channels is controlled independently.

12. The WTRU of claim 11, wherein the transmit power on each of the sub-channels is controlled adaptively.

13. The WTRU of claim 11, wherein the transmit power on each of the sub-channels is controlled adaptively using criteria including at least one of a signal power level, a noise level, and an interference level.

14. The WTRU of claim 11, wherein the downlink channel is a Packet Data Channel (PDCH).

* * * * *